United States Patent [19]
Dopp

[11] 4,369,568
[45] Jan. 25, 1983

[54] METHOD FOR MANUFACTURING CELLS UTILIZING CENTRIFUGING TECHNIQUES

[75] Inventor: Robert B. Dopp, Madison, Wis.

[73] Assignee: Ray-O-Vac Corporation, Madison, Wis.

[21] Appl. No.: 232,431

[22] Filed: Feb. 9, 1981

[51] Int. Cl.³ .................. H01M 4/04; H01M 4/38
[52] U.S. Cl. ............................ 29/623.2; 29/623.1
[58] Field of Search .............. 429/27, 66; 29/623.1, 29/623.2, 730

[56] References Cited

U.S. PATENT DOCUMENTS 1,956,012  4/1934  Egan .................................. 264/268
4,288,913  9/1981  Parsen et al. ..................... 29/623.1

FOREIGN PATENT DOCUMENTS 2815001 10/1979 Fed. Rep. of Germany ........ 429/27
1467708 11/1974 United Kingdom.

Primary Examiner—Lowell A. Larson
Assistant Examiner—Jonathan L. Scherer
Attorney, Agent, or Firm—Edward A. Steen; Raymond J. Kenny; Gilbert W. Rudman

[57] ABSTRACT

An improved metal-air button cell is provided. The cell is comprised of the following components: a conductive metal can, a cathode assembly in the can, a conductive metal cover, and a separator between the cathode assembly, wherein the metal cover and separator provide borders of a space in which an anode material can be placed. The improvement is that the amount of anode material is not sufficient to fill the space provided for it, and, wherein, the anode material is positioned against the separator and a void exists between the cover and the anode material.

5 Claims, 1 Drawing Figure

U.S. Patent        Jan. 25, 1983        4,369,568
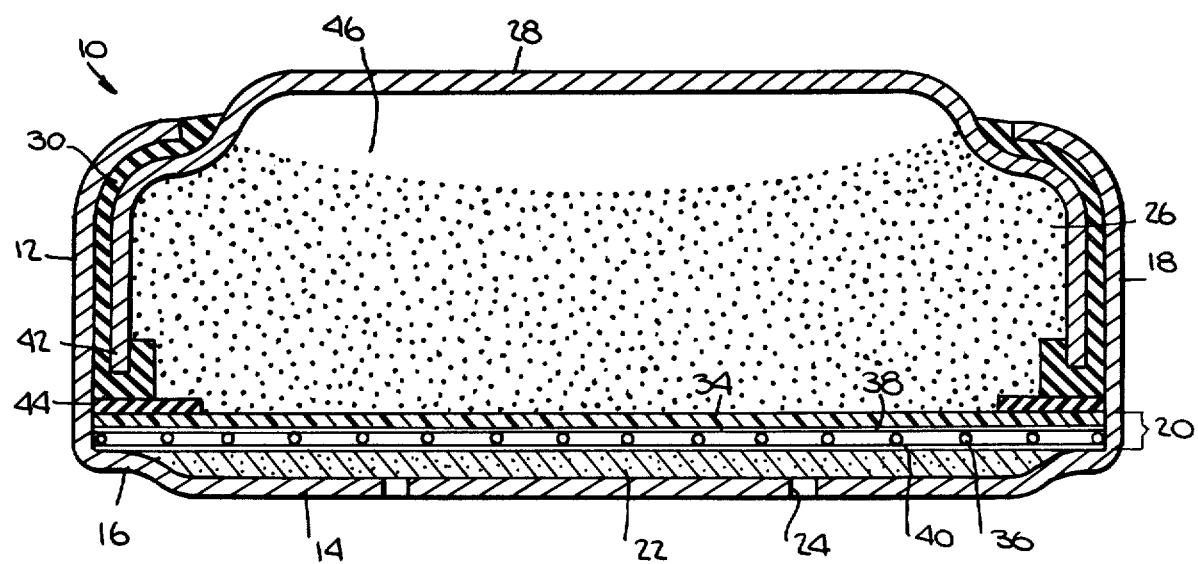

4,369,568

METHOD FOR MANUFACTURING CELLS UTILIZING CENTRIFUGING TECHNIQUES

BACKGROUND OF THE INVENTION

1. Field of the Invention

This invention relates to oxygen depolarized electrochemical cells. More particularly, it relates to metal-/oxygen batteries having improved impedance and capacity characteristics.

2. Prior Art

The concept of gas depolarized electrochemical cells is old in the art as evidenced by the numerous issued patents.

It is also known that gas depolarized electrochemical cells can have a "button" cell configuration and be used in a variety of applications such as hearing aids, transistor radios, watches, and miniature electronic calculators.

Zinc/air cells are unique as compared to other button cells in that a void must be provided in the anode portion of the cell. The void is used to accommodate the substantial increase in volume during discharge which occurs, for example, when zinc oxide is produced as the discharge product of zinc anode. The need for this void comes from the sensitivity of the air cathode to pressure. If the air cathode is over compressed there is premature cathode failure and hence cell failure.

However, this void, while providing room for the expansion of the anode material, causes high cell impedence and erratic cell performance when its location in the anode area is uncontrolled.

Sauer et al disclose in U.S. Pat. No. 4,054,726, one method of achieving controlled void space. The method is the use of a compressible expansion body positioned within the anode material. The problem with this method is that excessive space for anode material is lost thereby reducing the cell's capacity.

It would be desirable to have a cell which had a maximum amount of anode material and a void location which was controllable.

DRAWING

FIG. 1 is a cross-sectional view of a zinc/air button cell according to a preferred embodiment of the invention.

SUMMARY OF THE INVENTION

A metal/oxygen button cell is provided comprising an anode cover, an anode material, a cathode assembly, a cathode container, a grommet and a separator, wherein the anode material is positioned against the separator and a void exists between the anode material and the anode cover.

BRIEF DESCRIPTION OF THE DRAWING

While the specification concludes with claims, particularly pointing out and distinctly claiming the subject matter which is regarded as the invention, it is believed that the invention would be better understood from the following description of a preferred embodiment taking in conjunction with the accompanying drawing in which the FIGURE is a vertical section through a zinc/air button cell according to a preferred embodiment of the invention.

DESCRIPTION OF A PREFERRED EMBODIMENT

Referring now to the preferred embodiment of the FIGURE, shown as zinc/air button cell (10).

The cell (10) comprises a can (12) of, for example, nickel plated steel, nickel, alloys of nickel, stainless steel, etc., which forms a partial enclosure having a open top, a relatively flat bottom portion (14) with a shoulder (16) and a cylindrical wall portion (18).

A cathode assembly generally designated at (20) lies within the can (12).

A porous layer (22) serves both to distribute air uniformly over the cathode assembly and to provide support for the cathode assembly (20).

Admission of air to the cell is through at least one air passageway (24) in the flat bottom wall (14) of sufficient size to provide the cathode assembly (20) with access to the atmosphere through the porous layer (22).

An anode material (26), which can consist of any conventional porous mass of a suitable metal powder, e.g., a gelled amalgamated zinc powder or a sintered zinc compact, is situated within a compartment formed by the conductive metal cover (28), which serves as the negative terminal of the cell. The anode material is positioned against separator (34). There is a void space (46) between the anode material (26) and metal cover (28).

The metal cover is positioned within the wall portion (18) of the can (12) and is secured thereto with a grommet (30) which may be coated with an adhesive such as epoxy, polyamide on bitumin.

The anode material (26) is separated from the cathode assembly (20) by a separator (34).

The separator (34) can be any conventional material known in the art. These known materials include Pudo cellophane, Acropor WA (woven nylon base treated with polyvinylchloride), Celgard (microporous polypropylene), Permion (polyethylene grafted with polyvinyl chloride), Viscon (regenerated cellulose treated with polyvinylchloride), Pellon (polyester based), Dynel (acrylic copolymer) and the like.

An absorbant may be used and be constructed of any porous cellulose material or any other material conventionally used in batteries.

An electrolyte solution is added to the cell during assembly. A suitable alkaline electrolyte can be aqueous KOH or NaOH and a suitable electrolyte for cell using an organic redox system include an aqueous solution of zinc chloride and mixtures of zinc chloride and ammonium chloride. A substantially neutral electrolyte system may include ammonium chloride or manganese chloride or a mixture of manganese chloride and magnesium chloride solution.

The preferred cathode assembly (20) is a laminated structure. It is comprised of a current collector (36), an activating layer (38) and a hydrophobic layer (40).

The activating layer (38) usually is comprised of a pressed mixture of a hydrophobic material, such as a polyolefin, eg. polyethylene and polypropylene, and fluorocarbon, such as polytetrafluoroethylene, and material such as activated carbon or metal catalysts. It is preferred that the activating layer is a mixture of polytetrafluoroethylene and activated carbon.

Pressed adjacent to, embedded in or contained within the active material is the current collector (36). The current collector is for current takeoff and is in electrical contact with the cathode container. The current collector (36) may be a conductive metal, eg., nickel or stainless steel and may be a film, mesh or screen. It is preferred that the current collector is a nickel screen.

On the side of the active layer facing the air inlet opening there is at least one porous hydrophobic layer.

The purpose of this layer is to permit the passage of air to the active layer while preventing leakage of the electrolyte from the cell.

It is sometimes desirable to utilize more than one hydrophobic layer because faults may exist in the layer through which leakage may occur. The use of more than one layer reduces substantially the risk that leakage will occur through faults in the layer.

The hydrophobic layer may be comprised of a hydrophobic polymer having an oxygen permeability suitable for providing a predetermined oxygen flow into the cell corresponding to the average current density requirement of the cells. These materials include polyethylene, polypropylene, nylon, vinylidine chloride, vinyl chloride and fluorocarbon such as polytetrafluoroethylene. Polytetrafluoroethylene is the preferred material.

The cathode container contains a shoulder (16) which bears the closing force which is transferred during a crimping process via edge (42) of anode top (28) to the grommet (30) and to the washer (44).

It is preferred that the grommet (30) be J-shaped to enable the edge (42) of the top (28) to be inserted into the grommet (30).

Under the influence of this closing force, an electrolyte tight seal is produced between the sealing annular ring (44), cathode assembly (20) and shoulder (16) so that the electrolyte cannot penetrate into the porous layer (22) by creeping around the assembly.

The thermoplastic sealing washer and the grommet can be comprised of any non-conductive, alkali-resistant, elastic material. The washer and grommet do not have to be the same material. These materials include polyacetals, ABS resins (acrylonitrite-butadiene-styrene copolymers) polyamides (eg., Nylon 6, Nylon 6,6, Nylon 6,10, Nylon 11, Nylon 12) synthetic rubbers (eg. butyl rubber, silicone rubber, ethylene-propylene rubber, chloroprene rubber), polyolefins (polyethylene, polypropylene), fluorocarbons (tetrafluoroethylene) and other polymers such as polystyrene.

Preferred for the sealing washer are polyethylene and polystyrene.

A preferred method of simply and economically making the cell of the current invention is by placing the porous layer into the cathode can, placing thereon the cathode assembly, (a laminate of the hydrophobic layer, the active layer, the current collector, disc an the separator) and then inserting the washer.

The anode material and electrolyte is metered into the anode cover onto which has been placed the grommet. The anode portion of the cell is then inverted and fitted into the cathode portion of the cell.

The can is crimped, as known by those skilled in the art, to form a completed cell.

The completed cell is then centrifuged in a manner which moves the zinc against the separator. It has been found that when the centrifuge time is about one minute, a 200 G force is insufficient to obtain the desired effect and at about 1400 G damage to air cathode can occur. The preferred centrifugical force is about 700–1200 G, or more preferably about 900 G when the centrifuge time is one minute. These skilled in the art can easily ascertain the force to utilize for lower or greater time periods of treatment. However, the inventor has found that when 900 G are used the maximum effect is obtained between one to three minutes, at which time no greater effects are obtained, and it is possible to start to damage the air cathode.

EXAMPLE 1

Cells of the design of FIG. 1 were made. Half were centrifuged and half were not. The cells were then tested for impedence. The results are in the following Table.

|   | Impedance at 100 hz not centrifuged | Impedance at 100 hz after 800 G's for one minute |
|---|---|---|
| 1 | 8.19 ± 2.6 ohms | 1.95 ± 0.18 ohms |
| 2 | 5.36 ± 2.3 ohms | 1.98 ± 0.40 ohms |
| 3 | 4.17 ± 2.9 ohms | 1.99 ± 0.23 ohms |

I claim:

1. An improved method of manufacturing a metal-air button cell, the method including:
   (a) providing a cathode can,
   (b) placing a cathode assembly and a separator into the cathode can to form a cathode portion,
   (c) providing an anode cover,
   (d) placing a grommet upon the anode cover,
   (e) placing anode material into the anode cover to form an anode portion,
   (f) fitting the anode portion and fitting it into the cathod portion,
   (g) crimping the cathode cap upon the grommet to form a leak-resistant cell, wherein the improvement comprises centrifuging the cell to form a void between the anode material and the anode cover.

2. The method of claim 1 wherein the centrifugical force is about 200 G to about 1400 G.

3. The method of claim 2 wherein the centrifugical force is about 700–1200 G for a period of 1–3 minutes.

4. The method of claim 3 wherein the centrifugical force is about 900 G for a period of 1–3 minutes.

5. The method of claim 1 wherein the anode material is a gelled amalgamated zinc powder, to which electrolyte has been added, and wherein the centrifuging of the crimped cell is prior to the gelled amalgamated zinc powder having set.

* * * * *